United States Patent
Zhang (10) Patent No.: US 11,673,203 B1
(45) Date of Patent: Jun. 13, 2023

(54) ELECTRIC WELDER

(71) Applicant: Wenling AWT Machinery Co., Ltd., Zhejiang (CN)

(72) Inventor: Hui Zhang, Zhejiang (CN)

(73) Assignee: WENLING AWT MACHINERY CO., LTD., Zhejiang (CN)

( * ) Notice: Subject to any disclaimer, the term of this patent is extended or adjusted under 35 U.S.C. 154(b) by 0 days.

(21) Appl. No.: 17/859,063

(22) Filed: Jul. 7, 2022

(30) Foreign Application Priority Data

Apr. 29, 2022 (CN) .......................... 202210491711.8

(51) Int. Cl.
*B23K 9/28* (2006.01)
*B23K 9/12* (2006.01)

(52) U.S. Cl.
CPC ................ *B23K 9/28* (2013.01); *B23K 9/124* (2013.01)

(58) Field of Classification Search
CPC ...... B23K 9/1336; B23K 9/133; B23K 9/173; B23K 9/1333; B23K 9/295; B23K 9/124; B23K 9/125; B23K 9/16; B23K 9/10; B23K 9/1081; B23K 9/164; B23K 9/32; B23K 9/323; B23K 10/003; B23K 3/063; B23K 9/0061; B23K 9/095; B23K 9/1006; B23K 9/1075; B23K 9/12; B23K 9/122; B23K 9/123; B23K 9/167; B23K 9/205; B65H 59/04; B65H 2701/36; B65H 49/26; B65H 49/36; B65H 51/30; B65H 16/005; B65H 16/106; B65H 49/20; B65H 49/305; B65H 49/327; B65H 49/34; B65H 51/04; B65H 57/06; B65H 57/18; B65H 57/26; B65H 59/382; B65H 75/02; B65H 75/241; B21F 23/002

USPC ....... 219/137.7, 137.2, 130.1, 137.62, 137.9, 219/136, 137.31, 137.44, 137.71, 74, 113, 219/137.51, 137.61, 137.63, 137 R, 75,
(Continued)

(56) References Cited

U.S. PATENT DOCUMENTS 6,064,036 A * 5/2000 Kensrue ............... B23K 9/1333
219/137.2
6,286,748 B1 9/2001 Cooper
(Continued)

FOREIGN PATENT DOCUMENTS

| CN | 103706930 A | 4/2014 |
| CN | 206153730 U | 5/2017 |
| CN | 216298227 U | 4/2022 |

*Primary Examiner* — Tu B Hoang
*Assistant Examiner* — Vy T Nguyen
(74) *Attorney, Agent, or Firm* — Cooper Legal Group, LLC (57) ABSTRACT

The present application discloses an electric welder, and relates to a field of an electric welding equipment. The electric welder includes a shell, a welding barrel, a controller and a welding wire feeder; the shell includes a handheld part, and the welding barrel, the controller and the welding wire feeder are installed in the shell; the welding wire feeder is configured for conveying the welding wire into the welding barrel; the controller is configured for controlling a start and a stop of the welding wire feeder and an arcing of the welding wire. The welding barrel, the controller and the welding wire feeder are installed in the shell to form an integral structure, which makes the welder more convenient to carry. In addition, by providing the welding wire feeder, a frequent replacement of the welding rod during a welding process is reduced, and the overall operation is more convenient.

7 Claims, 7 Drawing Sheets

(58) Field of Classification Search
USPC ......... 219/98; 242/128, 564.4, 129.5, 157 R,
242/422.5, 423.1, 566, 578.1, 588.1,
242/588.2, 916; 174/15.7, 47; 310/75 R;
314/68, 69, 79, 85; 492/192
See application file for complete search history.

(56) References Cited

U.S. PATENT DOCUMENTS

| | | | | |
|---|---|---|---|---|
| 6,568,578 | B1* | 5/2003 | Kensrue | B23K 9/1336 226/176 |
| 2005/0218129 | A1* | 10/2005 | Kensrue | B23K 9/133 219/137.31 |
| 2005/0224484 | A1* | 10/2005 | Matiash | B23K 9/1336 219/137.2 |
| 2008/0210676 | A1* | 9/2008 | Lambirth | B23K 9/1006 219/130.1 |
| 2018/0021876 | A1* | 1/2018 | Ellis | B23K 9/164 219/74 |
| 2018/0099834 | A1* | 4/2018 | Madrid | B65H 57/18 |

\* cited by examiner

ELECTRIC WELDER

CROSS-REFERENCE TO RELATED APPLICATION

This application claims priority to China Patent Application serial No. 202210491711.8, filed on Apr. 29, 2022. The entirety of China Patent Application serial No. 202210491711.8 is hereby incorporated by reference herein and made a part of this specification.

TECHNICAL FIELD

The present application relates to a field of an electric welding equipment, particularly, relates to an electric welder.

BACKGROUND ART

An electric welder uses a high temperature electric arc generated during a momentary short circuiting between a positive pole and a negative pole to fuse a solder on an electrode and a material to be welded, so as to weld objects together.

The existing electric welder includes a machine body and a welding gun connected with the machine body, which is troublesome to carry; or it is a handheld welding gun, although it is convenient to carry, it requires an operator to load a welding rod from a muzzle of the welding gun. Because the welding rod is short, it needs to be continuously supplemented during a continuous operation, which is troublesome to use. The existing electric welder cannot achieve the convenience of carrying and using at the same time, which needs to be improved.

SUMMARY

The present application provides an electric welder that is convenient to carry and use.

The electric welder provided in the present application adopts the following technical solutions.

An electric welder includes a shell, a welding barrel, a controller and a welding wire feeder; the shell includes a handheld part, and the welding barrel, the controller and the welding wire feeder are installed in the shell;

the welding wire feeder is configured for conveying a welding wire into the welding barrel;

the controller is configured for controlling a start and a stop of the welding wire feeder and an arcing of the welding wire.

In the above technical solution, the welding barrel, the controller and the welding wire feeder are installed in the shell to form an integral structure, which makes the welder more convenient to carry. In addition, the welding wire feeder is directly provided in the shell, when welding, only the welding wire of the wire disc needs to be inserted in the welding wire feeder, which can continuously convey the welding wire of the wire disc to the welding barrel, so that a frequent replacement of the welding rod during a welding process is reduced, and the overall operation is more convenient.

In an implementation, the shell is provided with a mounting rod for a mounting of the wire disc with welding wire.

In the above technical solution, the mounting rod can be used for the mounting of the wire disc, when the welding wire feeder conveys the welding wire, the wire disc can rotate relative to the mounting rod to realize unreeling. The wire disc is mounted on the mounting rod, which reduce an influence of the wire disc on the overall operation and make a flexibility better.

In an implementation, a first chamber and a second chamber are provided in the shell, the first chamber and the second chamber are respectively provided at both ends of the handheld part; the handheld part is provided with a channel, and the first chamber and the second chamber are communicated through the channel; the welding barrel is communicated with the first chamber, and the welding wire feeder is located in the first chamber; the controller is located in the second chamber.

In the above technical solution, the handheld part is located between the welding wire feeder and the controller. By providing the welding wire feeder and the controller at both ends of the handheld part, the gravity at both ends can be balanced, and an occurrence of single end overweight can be reduced, so as to make it more convenient to use.

In an implementation, the welding wire feeder includes a mounting seat, a driving roller, a driven roller and a driving motor; the mounting seat is mounted in the shell, and the driving roller and the driven roller are both rotatably connected to the mounting seat, and the rotating axis of the driving roller is parallel to that of the driven roller; the driving motor is configured for driving the driving roller to rotate and for conveying the welding wire clamped between the driving roller and the driven roller.

In the above technical solution, when the welding wire feeder is in operation, the driving motor drives the driving roller to rotate. At this time, the driving roller drives the welding wire clamped between the driving roller and the driven roller to move, and the driven roller rotates under an action of a friction, so that the conveying of the welding wire by the welding wire feeder is more stable.

In an implementation, the mounting seat is hinged with a hinged strip, and a hinge axis of which is parallel to the rotating axis of the driving roller; the driven roller is rotatably connected with the hinged strip to realize a rotation relative to the mounting seat; the mounting seat is provided with an elastomer, and the driven roller has a tendency to abut against the driving roller under the action of an elastic force of the elastomer.

In the above technical solution, by providing the hinged strip and the elastomer, the driven roller abuts against the driving roller by the elastomer, so that a gap between the driving roller and the driven roller can be adjusted more flexibly, which facilitates a conveyance of the welding wires with different sizes.

In an implementation, the shell is provided with a mounting rod located in the first chamber and a mounting opening on the first chamber which communicated with the first chamber; the shell is provided with a cover plate configured for covering the mounting opening, and the cover plate is also provided with a locking member configured for fixing the cover plate with the shell.

In the above technical solution, the mounting rod is located in the first chamber, so that the wire disc can be mounted in the first chamber. Therefore, when the electric welder is used, the wire disc can be isolated from outside, so that the welding wire can be conveyed more stably.

In an implementation, the mounting rod is provided with a fixing rod, and the locking member is rotatably connected with the cover plate; the locking member and the fixing rod are in a threaded connection to fix the cover plate on the shell.

In the above technical solution, the locking member is rotatably connected with the shell and threaded with the fixing rod to fix the cover plate on the shell, so that a disassembly and an assembly of the cover plate is more convenient.

In an implementation, a mounting hole is provided in the mounting rod along an axial direction thereof, and a limit groove is provided at an end of the mounting rod away from the cover plate; an inner wall of the limit groove serves as a limit surface;

the fixing rod penetrates through the mounting hole, and a limit block is provided at the fixing rod; the limit block is embedded in the limit groove to prevent the fixing rod from disengaging from a direction towards the cover plate; an outer peripheral surface of the limit block abuts against the limit surface to limit the rotation of the fixing rod relative to the mounting rod.

In the above technical solution, the fixing rod is detachably connected with the shell, and the fixing rod can be a bolt, so that the overall mounting is more convenient. In addition, by using the fixing rod to connect, the fixing rod can be replaced after long term use to ensure a stable locking effect of the locking member.

In an implementation, the locking member includes a locking seat rotatably connected with the cover plate and a locking nut provided at the locking seat; the locking seat is provided with a locking hole which is a counterbore hole, the locking nut is located in the locking hole and abuts against the inner wall of the locking hole to limit the rotation of the locking nut; the locking seat is also provided with a locking block configured for preventing the locking nut from disengaging from the locking hole.

In the above technical solution, the locking nut is detachably connected with the locking seat, and the locking nut can directly adopt the nut with standard size, which makes molding more convenient. In addition, it is convenient to replace the locking nut after long term use, so that an overall use is more durable and stable.

In an implementation, the end of the locking seat away from the mounting rod is provided with a plurality of limit holes circumferentially arranged around the locking hole;

the locking block includes an embedded part and an abutting part formed integrally; the embedded part is configured for being embedded in the locking hole so as to abutting against the locking nut; the end of the abutting part close to the embedded part is provided with limit members; the number of the limit members and that of the limit holes is the same and their positions correspond to each other; each of the limit members includes an elastic connecting part provided at the abutting part and a limit part provided at the end of the elastic connecting part away from the abutting part; the limit part is configured for abutting against the end surface of the locking seat close to the mounting rod to prevent the locking block disengaging from the locking seat.

In the above technical solution, the locking block is provided to prevent the locking nut disengaging from the locking seat, so that the occurrence of a loss of locking nut can be reduced.

In an implementation, the end of the cover plate close to the first chamber is provided with a sliding seat slidably connected with an abutting ring; the cover plate is provided with an elastic restoration part, and the abutting ring abuts against an axial end surface of the wire disc mounted on the mounting rod under the elastic force of the elastic restoration part.

In the above technical solution, by providing the abutting ring and the elastic restoration part, after the wire disc is mounted on the mounting rod, the abutting ring abuts against the axial end surface of the wire disc, so that the rotation and unreeling of the wire disc is more stable. In addition, the unreeling of the wire disc is driven by the welding wire feeder, and the abutting of the abutting ring can allows the wire disc to be braked in time, so as to reduce the occurrence of excessive unreeling of wire disc, therefore the whole use is more stable.

In an implementation, the elastic restoration part is a spring located between the abutting ring and the cover plate; the end of the abutting ring close to the cover plate is provided with a positioning ring groove, and one end of the elastic restoration part can be embedded in the positioning ring groove to realize a positioning.

In the above technical solution, the elastic restoration part can be positioned by the positioning ring groove, so that the overall operation is more stable.

In an implementation, the end of the cover plate close to the first chamber is also provided with a guiding ring surrounding the sliding seat; the inner wall of the guiding ring is provided with a guiding groove; the outer wall of the abutting ring is provided with a guiding block which embedded in the guiding groove to limit the circumferential rotation of the abutting ring.

In the above technical solution, by the coordination of the guiding groove and the guiding block, the abutting ring cannot rotate in a circumferential direction, which makes the braking of the wire disc by the abutting ring more stable.

In an implementation, the abutting ring is sleeved on the sliding seat; the inner wall of the abutting ring is provided with a plurality of abutting blocks arranged circumferentially around the axis of the abutting ring; the outer wall of the sliding seat is provided with sliding grooves; the number of the sliding grooves and that of the abutting blocks is the same and their positions correspond to each other; the sliding groove is configured for the sliding of the abutting block, and the inner wall of the sliding groove towards the cover plate is configured for abutting against the end surface of the abutting block away from the cover plate to prevent the abutting ring from disengaging from the sliding seat.

In the above technical solution, the position of the abutting ring is limited by the abutting between the abutting ring and the inner wall of the sliding groove, so that the abutting ring is mounted at the cover plate. After the cover plated is disassembled, the abutting ring can be taken out directly, which makes the replacement of the wire disc more convenient.

In an implementation, elastic gaps are provided at both sides of the abutting block around the axis of the abutting ring; the end of the abutting block close to the axis of the abutting ring is provided with a guiding surface, which located at the end of the abutting block close to the cover plate; the guiding surface is configured for abutting against the sliding seat, such that the position where the abutting ring corresponding to the abutting block is deformed elastically, so that the abutting block moves to be embedded in the sliding groove.

In the above technical solution, by providing the guiding surface, the abutting ring is easy to be mounted at the sliding seat.

In an implementation, the controller includes a circuit board which is provided with a groove for a conducting wire passing through.

In the above technical solution, the groove is provided to make the conducting wire pass through easily, which reduces the occurrence of the conducting wires passing from the side of the circuit board during wiring, and makes the overall structure more compact.

In an implementation, the number of the handheld parts is two, a distribution direction of the two handheld parts is parallel to a length direction of the welding barrel.

In the above technical solution, by providing two handheld parts, it is convenient to operate the electric welder with both hands, so that the overall use is more convenient.

In an implementation, the controller is electrically connected with a start switch, and the start switch is provided at the handheld part away from the welding barrel.

In the above technical solution, by providing the start switch, the start and stop of the controller is controlled by the start switch, so as to control the start and stop of the welding wire feeder and the welding barrel.

In summary, the present application has at least one of the following beneficial technical effects.

(1) The welding barrel, the controller and the welding wire feeder are installed in the shell to form an integral structure, which makes the welder more convenient to carry. In addition, by providing the welding wire feeder, the frequent replacement of the welding rod during the welding process is reduced, and the overall operation is more convenient.

(2) The mounting rod is located in the first chamber, so that the wire disc can be mounted in the first chamber. Therefore, when the electric welder is used, the wire disc can be isolated from outside, so that the welding wire can be conveyed more stably.

(3) By providing the abutting ring and the elastic restoration part, the abutting ring abuts against the axial end surface of the wire disc, so that the rotation and unreeling of the wire disc is more stable. In addition, the abutting of the abutting ring can allows the wire disc to be braked in time, so as to reduce the occurrence of excessive unreeling of wire disc, therefore the whole use is more stable.

DETAILED DESCRIPTION

The present application is further described in detail in combination with attached drawings.

An embodiment of the present application discloses an electric welder.

Embodiment

Figure 1:
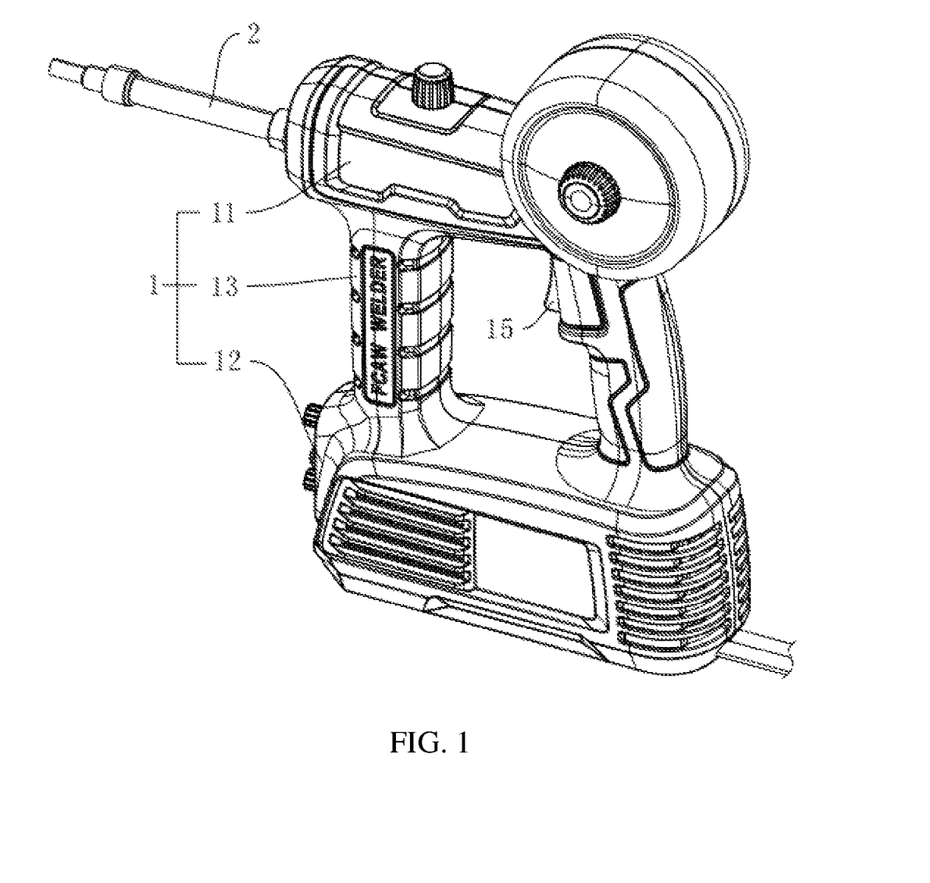
FIG. 1 is a schematic diagram illustrating an overall structure according to an embodiment.
Figure 2:
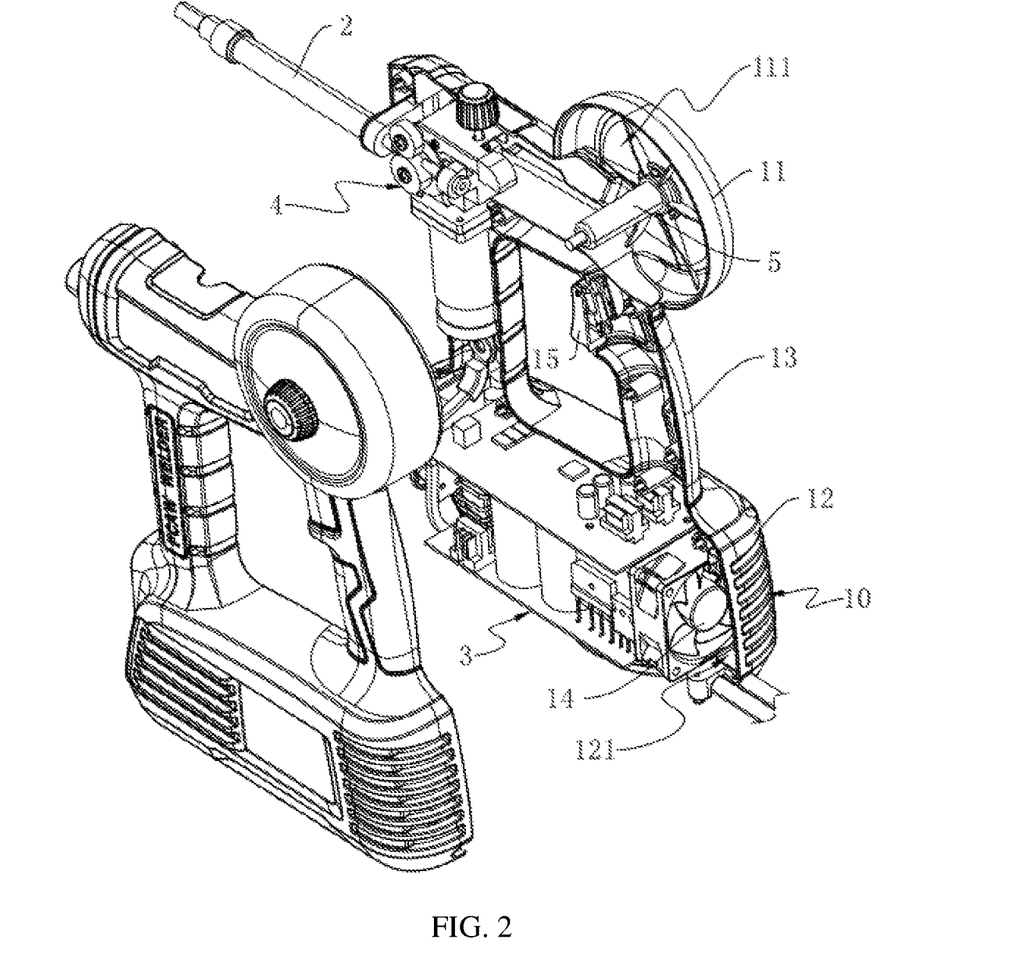
FIG. 2 is a schematic diagram illustrating a partial exploded structure according to the embodiment.

Referring to FIGS. 1 and 2, the electric welder includes a shell 1, a welding barrel 2, a controller 3 and a welding wire feeder 4. The shell 1 includes a first half shell and a second half shell, which fixed together by screws to form the shell 1. The shell 1 includes an upper seat body 11, a lower seat body 12 and a handheld part 13. The upper seat body 11 is provided directly above the lower seat body 12, and the handheld part 13 is provided between the upper seat body 11 and the lower seat body 12. The number of the handheld parts 13 is two, and the two handheld parts 13 are distributed along a horizontal direction. A first chamber 111 is provided in the upper seat body 11, and a second chamber 121 is provided in the lower seat body 12. The first chamber 111 and the second chamber 121 are respectively provided at both ends of the handheld part 13. Each handheld part 13 is provided with a channel, and the first chamber 111 and the second chamber 121 are communicated through the channel.

The welding barrel 2 is mounted at the upper seat body 11, and a length direction of the welding barrel 2 is parallel to a distribution direction of the two handheld parts 13. The welding barrel 2 is communicated with the first chamber 111, and a conductor is provided in the welding barrel 2. The conductor electrically connected with the controller 3 is a conductive sheet. When a welding wire passes through the welding barrel 2, the conductor and the welding wire can realize an electric conduction.

Figure 3:
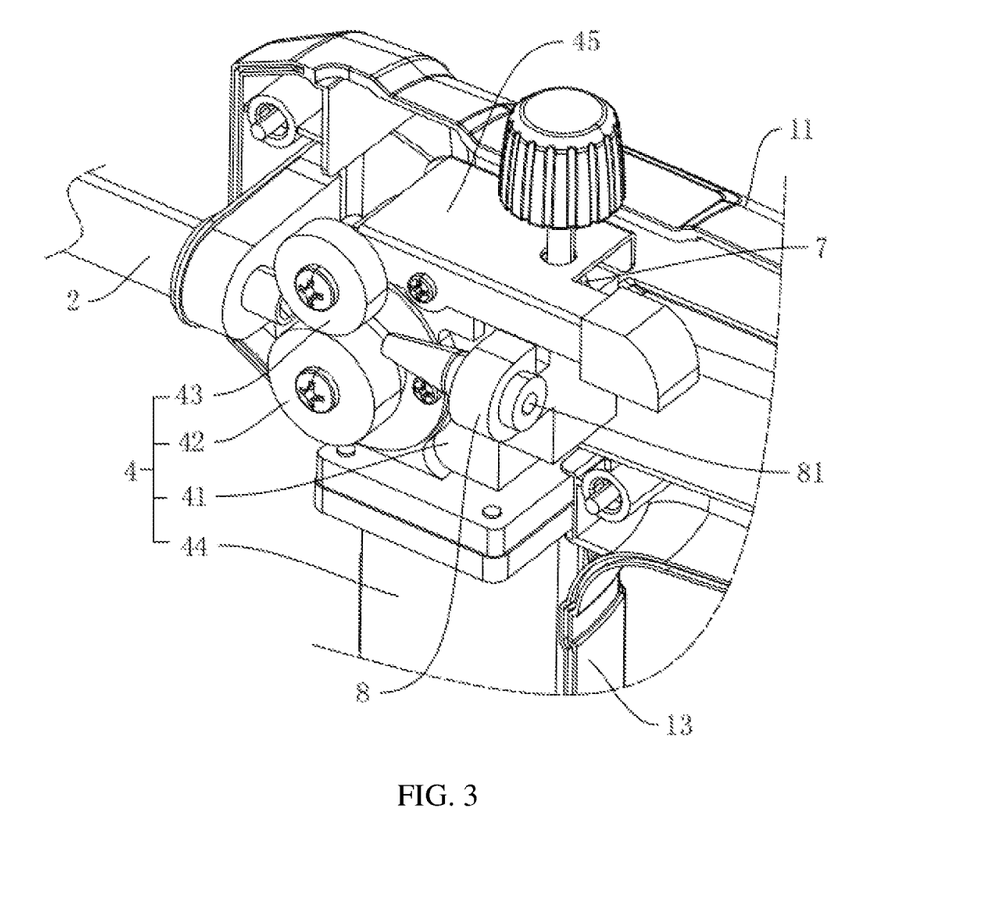
FIG. 3 is a schematic diagram illustrating a welding wire feeder according to the embodiment.

Referring to FIGS. 2 and 3, the shell 1 is fixedly provided with a mounting rod 5 located in the first chamber 111. The mounting rod 5 is a round rod, of which an axis is perpendicular to the length direction of the welding barrel 2. The welding wire feeder 4 is located in the first chamber 111 and between the mounting rod 5 and the welding barrel 2. Alternatively, the mounting rod 5 also can be located outside the shell 1, as long as a wire disc of the welding wire can be mounted on the mounting rod 5 and rotates relative to the mounting rod 5.

The welding wire feeder 4 includes a mounting seat 41, a driving roller 42, a driven roller 43 and a driving motor 44. The mounting seat 41 is mounted in the shell 1, and the driving roller 42 is rotatably connected to the mounting seat 41, and the rotating axis of the driving roller 42 is parallel to the axis of the mounting rod 5. The driving motor 44 is a servo motor or a stepping motor or the like. The driving motor 44 is mounted in the handheld part 13 close to the welding barrel 2, and the driving motor 44 drives the driving roller 42 to rotate by a gear box transmission. Alternatively, the driving motor 44 can be directly connected with the driving roller 42 to drive the driving roller 42 to rotate.

The mounting seat 41 is hinged with a hinged strip 45 which located above the mounting seat 41, and a hinge axis of the hinged strip 45 is parallel to the rotating axis of the driving roller 42. The driven roller 43 is rotatably connected with the hinged strip 45, and the driven roller 43 is located above the driving roller 42, and the rotating axis of the driven roller 43 is parallel to that of the driving roller 42. The mounting seat 41 is also provided with an elastomer 7 which is a spring, and the elastomer 7 is located between the mounting seat 41 and the hinged strip 45. In this embodiment, the elastomer 7 and the driven roller 43 are respectively located at both sides of the hinge axis of the hinged strip 45. The driven roller 43 has a tendency to abut against the driving roller 42 under an elastic force of the elastomer 7, therefore when the welding wire passes between the driving roller 42 and the driven roller 43, the welding wire abuts against an outer wall of the driving roller 42 by the driven roller 43 under the elastic force of the elastomer 7, so that when the driving motor 44 drives the driving roller 42 to rotate, the welding wire is conveyed to the welding barrel 2.

Referring to FIGS. 2 and 3, in order to make a conveyance of the welding wire more stable, the mounting seat 41 is also provided with a welding wire guide part 8, which is located at a side of the contact point between the driving roller 42 and the driven roller 43 that is close to the mounting rod 5. A welding wire guide hole 81 is provided in the welding wire guide part 8 along a tangent direction of the contact point between the driving roller 42 and the driven roller 43. The welding wire of the wire disc on the mounting rod 5 passes through the welding wire guide hole 81 and then passes between the driving roller 42 and the driven roller 43, so that a possibility of the welding wire dropping between the driving roller 42 and the driven roller 43 is reduced.

Figure 4:
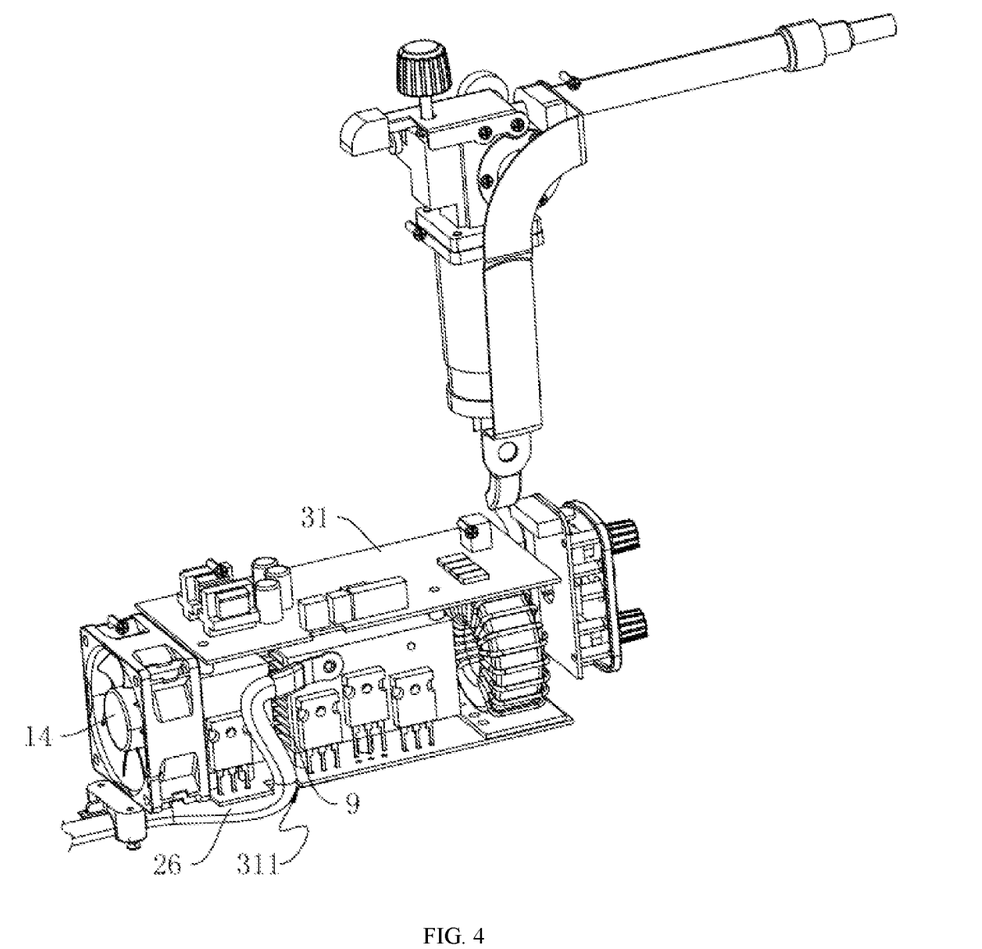
FIG. 4 is a schematic diagram illustrating a controller according to the embodiment.

Referring to FIGS. 2 and 4, the controller 3 is mounted in the second chamber 121. The controller 3 includes two circuit boards 31 distributed up and down, and a heat dissipating fin 9 is mounted between the two circuit boards 31, and a heat dissipating hole 10 is provided at the outer wall of the lower seat body 12. The heat dissipating hole 10 is communicated with the second chamber 121 and faces the heat dissipating fin 9, and a cooling fan 14 is also provided between the heat dissipating hole 10 and the heat dissipating fin 9. An outer side of the lower circuit board 31 is provided with a groove 311. When wiring a conducting wire 26 can be connected with the upper circuit board 31 through the groove 311, so that an overall structure is more compact.

The controller 3 is also electrically connected with a start switch 15. In this embodiment, the start switch 15 is provided at the handheld part 13 away from the welding barrel 2, and located between the two handheld parts 13. When the start switch 15 is triggered, the controller 3 controls the driving motor 44 to operate to convey the welding wire through the welding barrel 2. During the process, the welding wire contacts with the conductor in the welding barrel 2 to form an electrical connection, and the controller 3 can also control to supply power to the conductor in the welding barrel 2, so that an arc is formed at a welding point between the welding wire and a work piece. When the start switch 15 is in an off state, the conductor in the welding barrel 2 is in a power off state, and the driving motor 44 is inoperative.

Figure 5:
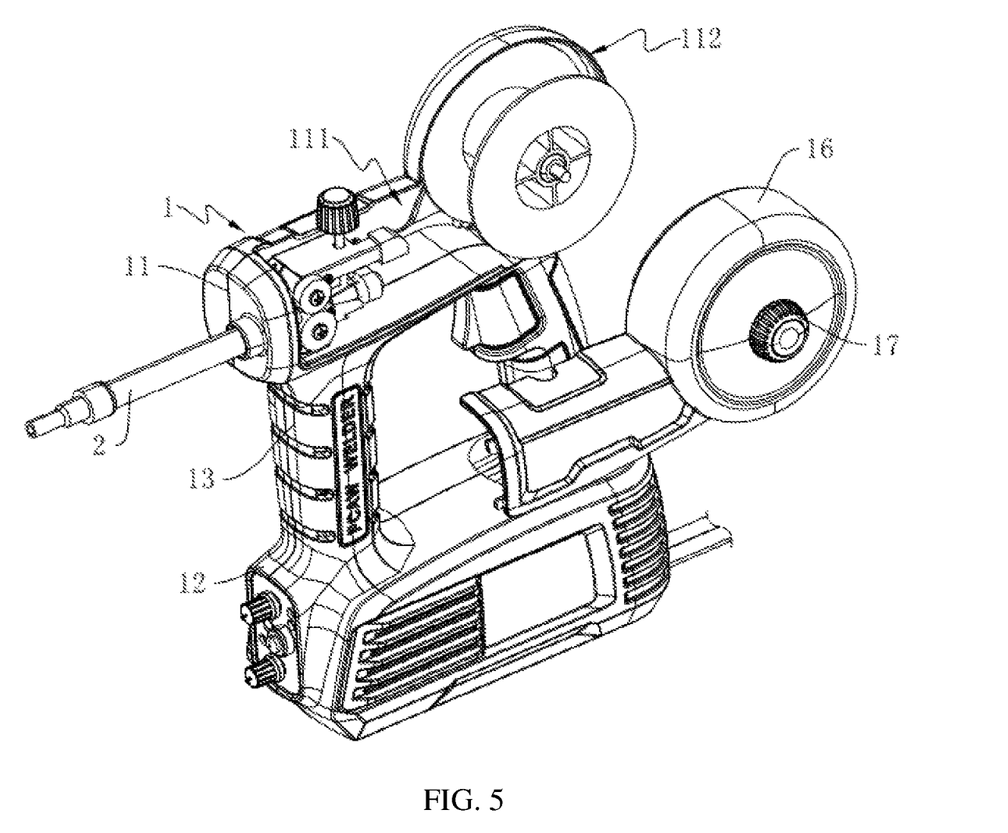
FIG. 5 is a schematic diagram illustrating a cover plate in an opening state according to the embodiment.

Referring to FIG. 5, a side wall of the upper seat body 11 of the shell 1 is provided with a mounting opening 112, which is located at one end in an axial direction of the mounting rod 5, and the mounting opening 112 is communicated with the first chamber 111. A cover plate 16 is detachably connected with the shell 1, and the cover plate 16 is also provided with a locking member 17 for fixing the cover plate 16 on the shell 1 and covering the mounting opening 112.

Figure 6:
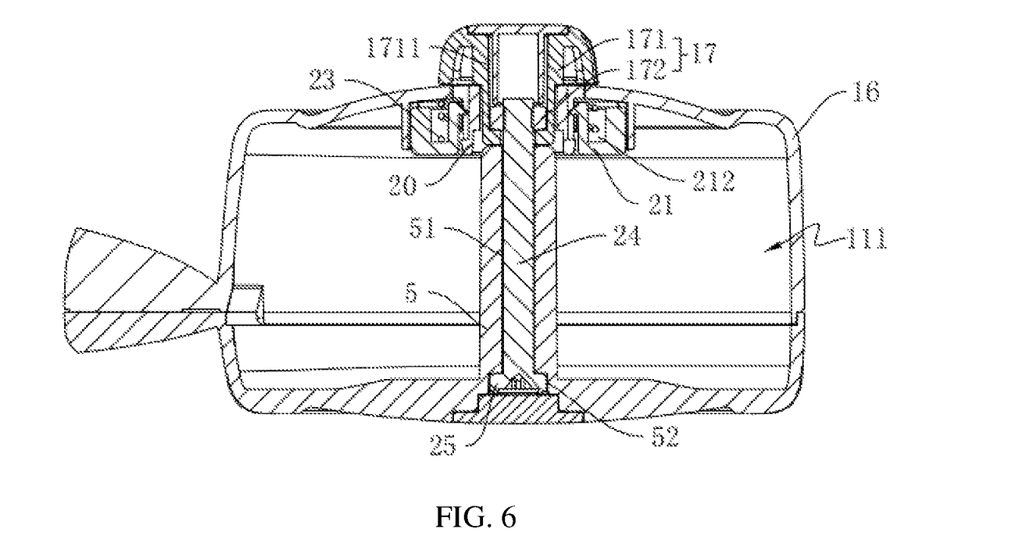
FIG. 6 is a sectional view according to the embodiment.

Referring to FIGS. 5 and 6, a mounting hole 51 is provided in the mounting rod 5 along the axial direction. A limit groove 52 is provided at the end of the mounting rod 5 away from the cover plate 16. The limit groove 52 is regular hexagonal, and each inner wall of the limit groove 52 serves as a limit surface. A fixing rod 24 penetrates through the mounting hole 51, and a limit block 25 is fixed at the fixing rod 24. The shape of the limit block 25 corresponds to the shape of the limit groove 52, and the outer wall of the limit block 25 abuts against the limit surface of the limit groove 52 to limit a circumferential rotation of the fixing rod 24. In this embodiment, the fixing rod 24 and the limit block 25 form an outer hexagon bolt. The fixing rod 24 is a screw part of the outer hexagon bolt, and the limit block 25 is a head part of the outer hexagon bolt. Alternatively, the limit groove 52 can be square or other non-circular, and the shape of the limit block 25 corresponds to the shape of the limit groove 52 to limit the circumferential rotation of the fixing rod 24.

Figure 7:
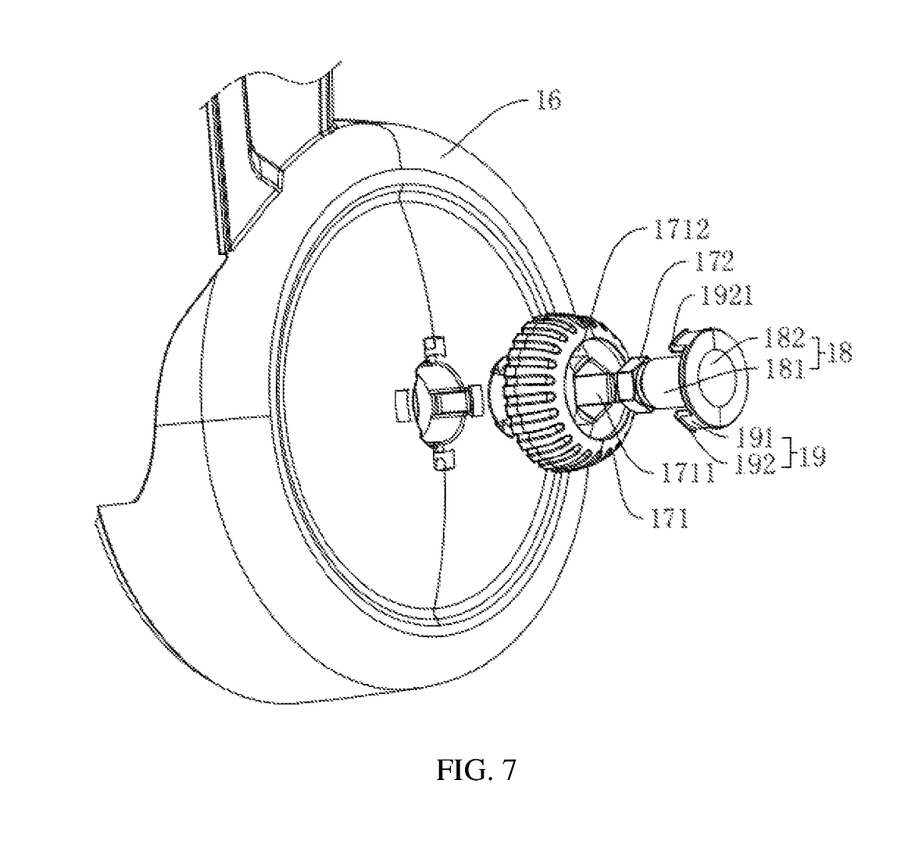
FIG. 7 is an explosive diagram of a locking member according to the embodiment.

Referring to FIGS. 6 and 7, the locking member 17 includes a locking seat 171 and a locking nut 172. The locking seat 171 is provided at an end surface of the cover plate 16 away from the first chamber 111, and the locking seat 171 is rotatably connected with the cover plate 16. The rotating axis of the locking seat 171 and the cover plate 16 coincides with the axis of the fixing rod 24. The end of the locking seat 171 away from the fixing rod 24 is provided with a locking hole 1711 which is a counterbore hole, and the axis of the locking hole 1711 coincides with the rotating axis of the locking seat 171. The locking nut 172 is located in the locking hole 1711. The locking nut 172 cannot pass through the locking hole 1711 from the direction toward the first chamber 111, and the locking nut 172 abuts against the inner wall of the locking hole 1711 to limit the rotation of the locking nut 172 about its own axis. When the cover plate 16 covers the mounting opening 112 of the shell 1, the locking nut 172 and the fixing rod 24 are in a threaded connection by rotating the locking member 17 to fix the cover plate 16.

In order to make the position of the locking nut 172 in the locking hole 1711 more stable, the end of the locking seat 171 away from the mounting rod 5 is provided with a plurality of limit holes 1712 circumferentially arranged around the locking hole 1711. The locking seat 171 is also provided with a locking block 18 including an embedded part 181 and an abutting part 182 formed integrally. The embedded part 181 is inserted into the locking hole 1711 and abuts against the locking nut 172 to limit the position. The end of the abutting part 182 close to the embedded part 181 is provided with plastic limit members 19. The number of the limit members 19 and that of the limit holes 1712 is the same and their positions correspond to each other. Each of the limit members 19 includes an elastic connecting part 191 fixed at the abutting part 182 and a limit part 192 fixed at the end of the elastic connecting part 191 away from the abutting part 182, and the end of the limit part 192 away from the elastic connecting part 191 is provided with a guiding oblique surface 1921.

When the limit member 19 is mounted, the guiding oblique surface 1921 abuts against the inner wall of the limit hole 1712 which resulting the elastic connecting part 191 deformed, so that the limit part 192 can pass through the limit hole 1712. After the limit part 192 passes through the limit hole 1712, the limit part 192 abuts the end surface of the locking seat 171 close to the mounting rod 5, so as to prevent the locking block 18 from disengaging from the locking seat 171.

Figure 8:
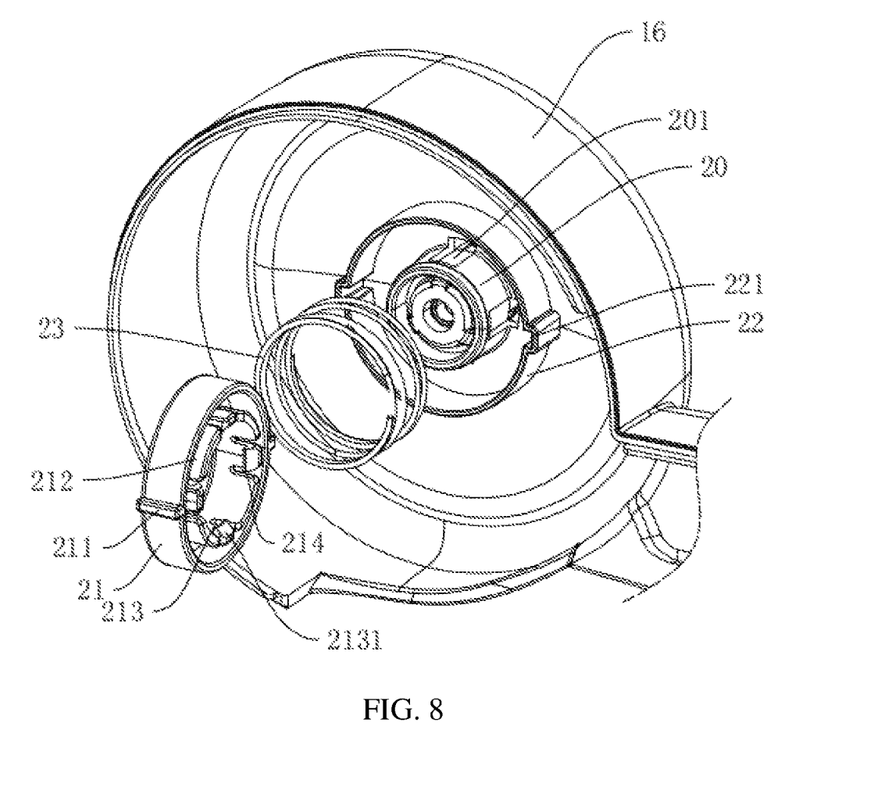
FIG. 8 is a schematic diagram illustrating a mounting structure of an abutting ring and a sliding seat according to the embodiment.

Referring to FIGS. 6 and 8, the end of the cover plate 16 close to the first chamber 111 is fixed with a sliding seat 20. An abutting ring 21 is sleeved on the sliding seat 20, and the abutting ring 21 is slidably connected with the sliding seat 20 along the axial direction of the mounting rod 5. In order to guide a sliding of the abutting ring 21, the end of the cover plate 16 close to the first chamber 111 is also fixed with a guiding ring 22 surrounding the sliding seat 20. A guiding groove 221 is provided in the inner wall of the guiding ring 22, and a guiding block 211 is provided at the outer wall of the abutting ring 21, and the guiding block 211 is inserted into the guiding groove 221 to limit the circumferential rotation of the abutting ring 21.

An elastic restoration part 23 is provided between the cover plate 16 and the abutting ring 21. The elastic restoration part 23 is a spring, and the elastic restoration part 23 is sleeved on the sliding seat 20. One end of the elastic restoration part 23 abuts against the cover plate 16 and the other end abuts against the abutting ring 21. In order to make the position of the elastic restoration part 23 more stable, a positioning ring groove 212 is provided in the end of the abutting ring 21 close to the cover plate 16, and the end of the elastic restoration part 23 close to the abutting ring 21 can be inserted into the positioning ring groove 212 to realize a positioning. After the wire disc is mounted on the mounting rod 5 and the cover plate 16 covers the mounting opening 112, the abutting ring 21 abuts against the axial end surface of the wire disc under the action of the elastic force of the elastic restoration part 23.

Referring to FIGS. 6 and 8, the outer wall of the sliding seat 20 is provided with a plurality of sliding grooves 201 which arranged circumferentially around the sliding seat 20 uniformly. Each of the sliding grooves 201 extends along the axial direction of the sliding seat 20. The inner wall of the abutting ring 21 is fixed with a plurality of abutting blocks 213 which located at the end of the abutting ring 21 close to the cover plate 16, and arranged circumferentially around the axis of the abutting ring 21. The number of the abutting blocks 213 and that of the sliding grooves 201 is the same and their positions correspond to each other. Elastic gaps 214 are provided at both sides of the abutting block 213 around the axis of the abutting ring 21. The position of the abutting ring 21 corresponding to the abutting block 213 forms a thin wall structure the positioning ring groove 212, and which can be deformed under the action of radial force through the elastic gap 214. The end of the abutting block 213 close to the axis of the abutting ring 21 is provided with a guiding surface 2131 which located at the end of the abutting block 213 close to the cover plate 16.

When the abutting ring 21 is mounted, the end of the abutting ring 21 provided with the abutting block 213 is sleeved towards the sliding seat 20. At this time, the guiding surface 2131 is configured for abutting against the sliding seat 20, such that the position where the abutting ring 21 corresponding to the abutting block 213 is deformed elastically, so that the abutting block 213 moves to insert into the sliding groove 201. At this time, the sliding groove 201 is configured for guiding the sliding of the abutting block 213, and the inner wall of the sliding groove 201 towards the cover plate 16 is configured for abutting against the end surface of the abutting block 213 away from the cover plate 16 to prevent the abutting ring 21 from disengaging from the sliding seat 20.

The above described are the preferred embodiments of the present application, and do not limit a scope of the present application. Therefore, all equivalent changes made according to a structure, a shape and a principle of the present application shall be covered by the scope of protection of the present application.

What is claimed is:

1. An electric welder, comprising a shell, a welding barrel, a controller and a welding wire feeder; wherein, the shell comprises a handheld part, and the welding barrel, the controller and the welding wire feeder are located in the shell;
   the welding wire feeder is configured for conveying a welding wire into the welding barrel;
   the controller is configured for controlling a start and a stop of the welding wire feeder and an arcing of the welding wire;
   a first chamber and a second chamber are provided in the shell, the first chamber and the second chamber are respectively provided at both ends of the handheld part; the handheld part is provided with a channel, the first chamber and the second chamber are in communication through the channel; the welding barrel is in communication with the first chamber; the welding wire feeder is located in the first chamber, and the controller is located in the second chamber;
   the shell is provided with a mounting rod located in the first chamber and a mounting opening on the first chamber which is in communication with the first chamber; the shell is provided with a cover plate configured for covering the mounting opening, and the cover plate is provided with a locking member configured for fixing the cover plate with the shell;
   the mounting rod is provided with a fixing rod, the locking member is rotatably connected with the cover plate; the locking member and the fixing rod are in a threaded connection to fix the cover plate on the shell;
   a mounting hole is provided in the mounting rod along an axial direction of the mounting rod, and a limit groove is provided at an end of the mounting rod away from the cover plate; an inner wall of the limit groove serves as a limit surface;
   the fixing rod penetrates through the mounting hole, and a limit block is fixed at the fixing rod; the limit block is embedded in the limit groove to prevent the fixing rod from disengaging from a direction towards the cover plate; an outer peripheral surface of the limit block abuts against the limit surface to limit rotation of the fixing rod relative to the mounting rod;
   the locking member comprises a locking seat rotatably connected with the cover plate and a locking nut provided at the locking seat; the locking seat is provided with a locking hole which is a counterbore hole, the locking nut is located in the locking hole and abuts against an inner wall of the locking hole to limit rotation of the locking nut; the locking seat is provided with a locking block configured for preventing the locking nut from disengaging from the locking hole.

2. The electric welder according to claim 1, wherein, the welding wire feeder comprises a mounting seat, a driving roller, a driven roller and a driving motor; the mounting seat is mounted in the shell, the driving roller and the driven roller are both rotatably connected to the mounting seat, and a rotating axis of the driving roller is parallel to a rotating axis of the driven roller; and the driving motor is configured for driving the driving roller to rotate and to convey the welding wire clamped between the driving roller and the driven roller.

3. The electric welder according to claim 2, wherein, the mounting seat is hinged with a hinged strip, and a hinge axis of the hinged strip is parallel to the rotating axis of the driving roller; the driven roller is rotatably connected with the hinged strip to realize a rotation relative to the mounting seat; the mounting seat is provided with an elastomer, and the driven roller has a tendency to abut against the driving roller under an action of an elastic force of the elastomer.

4. The electric welder according to claim 1, wherein, an end of the locking seat away from the mounting rod is provided with a plurality of limit holes circumferentially arranged around the locking hole;
   the locking block comprises an embedded part and an abutting part formed integrally; the embedded part is configured for being embedded in the locking hole so as to abut against the locking nut; an end of the abutting part close to the embedded part is provided with limit members; a number of the limit members is equal to a number of the limit holes and positions of the limit members and positions of the limit holes correspond to each other; each of the limit members comprises an elastic connecting part provided at the abutting part and a limit part provided at an end of the elastic connecting part away from the abutting part; the limit part is configured for abutting against an end surface of the locking seat close to the mounting rod to prevent the locking block from disengaging from the locking seat.

5. The electric welder according to claim 1, wherein, an end of the cover plate close to the first chamber is provided with a sliding seat slidably connected with an abutting ring; the cover plate is provided with an elastic restoration part, and the abutting ring abuts against an axial end surface of a wire disc mounted on the mounting rod due to an elastic force of the elastic restoration part;

the elastic restoration part is a spring located between the abutting ring and the cover plate; an end of the abutting ring close to the cover plate is provided with a positioning ring groove, and one end of the elastic restoration part is configured to be embedded in the positioning ring groove to realize a positioning.

6. The electric welder according to claim 5, wherein, the end of the cover plate close to the first chamber is provided with a guiding ring surrounding the sliding seat; an inner wall of the guiding ring is provided with a guiding groove; an outer wall of the abutting ring is provided with a guiding block which is embedded in the guiding groove to limit circumferential rotation of the abutting ring;

the abutting ring is sleeved on the sliding seat; an inner wall of the abutting ring is provided with a plurality of abutting blocks arranged circumferentially around an axis of the abutting ring; an outer wall of the sliding seat is provided with sliding grooves; a number of the sliding grooves and a number of the abutting blocks is the same and positions of the sliding grooves and positions of the abutting blocks correspond to each other; each of the sliding grooves is configured for sliding of a corresponding one of the abutting blocks, and an inner wall of each of the sliding grooves towards the cover plate is configured for abutting against an end surface of the corresponding one of the abutting blocks away from the cover plate to prevent the abutting ring from disengaging from the sliding seat;

elastic gaps are provided at both sides of each of the abutting blocks around the axis of the abutting ring; an end of each of the abutting blocks close to the axis of the abutting ring is provided with a guiding surface, which is located at an end of each of the abutting blocks close to the cover plate; the guiding surface is configured for abutting against the sliding seat, such that a position where the abutting ring corresponds to each of the abutting blocks is deformed elastically, and so that each of the abutting blocks moves to be embedded in a corresponding one of the sliding grooves.

7. The electric welder according to claim 1, wherein, the controller comprises a circuit board provided with a groove for a conducting wire passing through.

* * * * *